(12) United States Patent
Jiang et al.

(10) Patent No.: US 12,227,347 B2
(45) Date of Patent: Feb. 18, 2025

(54) FULLY AUTOMATIC INDUCTIVE SAMPLE-COLLECTING BUCKET CAPABLE OF STORING SAMPLE INFORMATION

(71) Applicant: INFINITY INTELLIGENCE & INFORMATION (SUZHOU) TECHNOLOGY CO., LTD., Suzhou (CN)

(72) Inventors: Ying Jiang, Suzhou (CN); Yunfei Luo, Suzhou (CN); Xuan Huan, Suzhou (CN)

(73) Assignee: INFINITY INTELLIGENCE & INFORMATION (SUZHOU) TECHNOLOGY CO., LTD., Suzhou (CN)

( * ) Notice: Subject to any disclaimer, the term of this patent is extended or adjusted under 35 U.S.C. 154(b) by 368 days.

(21) Appl. No.: 17/787,340

(22) PCT Filed: Aug. 27, 2020

(86) PCT No.: PCT/CN2020/111905
§ 371 (c)(1),
(2) Date: Jun. 20, 2022

(87) PCT Pub. No.: WO2021/120682
PCT Pub. Date: Jun. 24, 2021

(65) Prior Publication Data
US 2023/0013099 A1    Jan. 19, 2023

(30) Foreign Application Priority Data

Dec. 20, 2019 (CN) .......................... 201911327805.6

(51) Int. Cl.
*B65D 55/14* (2006.01)
*B65D 1/16* (2006.01)
(Continued)

(52) U.S. Cl.
CPC ................ *B65D 55/14* (2013.01); *B65D 1/16* (2013.01); *B65D 43/0204* (2013.01); *G01N 1/00* (2013.01); *B65D 2543/00092* (2013.01)

(58) Field of Classification Search
CPC ...... B65D 55/14; B65D 1/16; B65D 43/0204; B65D 2543/00092; B65D 2543/00231;
(Continued)

(56) References Cited

U.S. PATENT DOCUMENTS 4,984,832 A    1/1991  Canepa
6,350,418 B1   2/2002  Venderpool et al.

FOREIGN PATENT DOCUMENTS

CN    103991626 A    8/2014
CN    104828380 A    8/2015
(Continued)

*Primary Examiner* — Robert R Raevis
(74) *Attorney, Agent, or Firm* — Bayramoglu Law Offices LLC

(57) ABSTRACT

A fully automatic inductive sample-collecting bucket capable of storing sample information includes a bucket, and a bucket cover snap-fitted to an upper end of the bucket. A bucket cover cavity is formed in the bucket cover. A locking mechanism, and a control mechanism for driving the locking mechanism to act are integrated in the bucket cover cavity. An integrated circuit (IC) card inductive control assembly is integrated in the bucket cover. The bucket is provided with a radio frequency identification (RFID) chip. The IC card inductive control assembly is configured to identify IC card unlocking information of an external grip for cover opening work and to drive the control mechanism to work to control an action of the locking mechanism. The sample-collecting bucket integrates an RFID card capable of carrying sample coding information, and can realize the automatic cover-sealing and cover-opening function under the identification and control of the controller.

10 Claims, 5 Drawing Sheets

(51) Int. Cl.
*B65D 43/02* (2006.01)
*G01N 1/00* (2006.01)

(58) Field of Classification Search
CPC ...... B65D 2203/10; B65D 2543/00314; B65D 2203/00; B65D 2221/00; B01L 2200/0689; B01L 2200/14; B01L 2300/022; B01L 2300/046; B01L 3/50825; B01L 3/545; G01N 2001/002; G01N 1/00; G01N 2001/005
USPC .... 73/863, 864.64, 864.91; 70/1, 57, 58, 63, 70/158, 163–173; 220/784–795
See application file for complete search history.

(56) References Cited

FOREIGN PATENT DOCUMENTS

| | | | | | |
|---|---|---|---|---|---|
| CN | 204606261 | U | * | 9/2015 | |
| CN | 105083737 | A | | 11/2015 | |
| CN | 204897348 | U | | 12/2015 | |
| CN | 105752470 | A | * | 7/2016 | ............. B65D 43/24 |
| CN | 205955607 | U | | 2/2017 | |
| CN | 108249036 | A | * | 7/2018 | ............. B65D 55/14 |
| CN | 207670972 | U | | 7/2018 | |
| CN | 208790250 | U | | 4/2019 | |
| CN | 209443944 | U | | 9/2019 | |
| CN | 110861836 | A | | 3/2020 | |

* cited by examiner

FULLY AUTOMATIC INDUCTIVE SAMPLE-COLLECTING BUCKET CAPABLE OF STORING SAMPLE INFORMATION

CROSS REFERENCE TO THE RELATED APPLICATIONS

This application is the national phase entry of International Application No. PCT/CN2020/111905, filed on Aug. 27, 2020, which is based upon and claims priority to Chinese Patent Application No. 201911327805.6, filed on Dec. 20, 2019, the entire contents of which are incorporated herein by reference.

TECHNICAL FIELD

The present invention relates to the technical field of material collection, in particular to a fully automatic inductive sample-collecting bucket capable of storing sample information

BACKGROUND

In the usage or circulation of bulk materials, such as coal, iron ore, cement and the like, it is generally required to collect samples for analysis, and the collected samples will be stored or transported to laboratory according to demands. Thus, in this process, it is necessary to have locking function and excellent sealing between the bucket cover and the bucket body of the sample-collecting bucket in order to prevent from intended adulteration, replacement or sample loss (such as water loss).

Additionally, due to the development of industrial intellectualization technology, the collecting-and-processing industry also tends to improve work efficiency and reduce operating procedures by improving the intelligence.

However, the current intelligence of the cipher bucket for sampling is low, resulting in that the unlocking and locking function can only be completed by manual remote control, and the functions such as automatic packaging, automatic identification of sample information, and automatic cover-opening cannot be realized after the cipher bucket completes material feeding.

The Chinese utility model patent "a bucket with password cover" (Granted Patent Publication No. CN207670972U, Patent Application No. 201721293934.4) tries to simplify the structure of a bucket body. A controller is integrated in the bucket body to facilitate operation and achieve other functions. However, it is found from research that the patented technology still cannot realize the automatic identification of the sample information, and automatic opening and closing of the cover-opening and cover-closing structure.

Chinese patent "a self-opening and closing cipher bucket" (Patent Publication No. CN105083737A, Patent Application No. 201510575262.5) provides a cipher bucket that can open and close the cover automatically. A driving structure that can make the bucket cover open and close is integrated on a side of the cipher bucket. The structure is complicated and the cipher bucket cannot open and close the bucket cover automatically according to the category of material identified.

Chinese patent "Locking sample bucket based on intelligent control" (Granted Patent Publication No. CN208790250U, Patent Application No. 201821601268.0) provides an RFID card reader that is integrated in the bucket to identify material identification signals. However, the integrated locking structure cannot satisfy the current storage and transportation requirements for the collected samples for analysis.

To solve the above technical problems, it is highly desirable for the skilled in the art to improve the sample-collecting buckets in the prior art.

SUMMARY

To solve the problems of manually controlled and low intelligence of the opening and closing of the sample-collecting bucket in the prior art, the present invention provides a fully automatic inductive sample-collecting bucket capable of identifying and storing sample information.

To solve the problems, the technical solutions provided by the present invention are as follows:

A fully automatic inductive sample-collecting bucket capable of storing sample information of the present invention may include:

a bucket, where a sample cavity for storing samples is formed in the bucket; and a bucket cover snap-fitted to an upper end of the bucket.

A bucket cover cavity is formed in the bucket cover.

A locking mechanism, and a control mechanism for driving the locking mechanism to act are integrated in the bucket cover cavity.

The locking mechanism includes clamping jaw locking rods configured to partially extend outside the bucket cover cavity, and the control mechanism drives the clamping jaw locking rods to act to realize the locking and unlocking between the bucket cover and the bucket.

An integrated circuit (IC) card inductive control assembly is integrated in the bucket cover.

The bucket is provided with a radio frequency identification (RFID) chip.

The RFID chip is configured to store sample coding information.

The IC card inductive control assembly is configured to identify IC card unlocking information of an external grip for cover opening work and to drive the control mechanism to work to control an action of the locking mechanism.

Further, the bucket includes a bucket body having an integrated structure, and a bucket mouth portion formed at an upper end of the bucket body and having an opening bucket mouth.

The bucket cover is installed at the bucket mouth portion, and the locking mechanism and the bucket mouth portion form a locking structure.

Further, the bucket cover includes the bucket cover cavity and an upper bucket cover plate mounted at an upper end of the bucket cover cavity.

A fixed plate is mounted in the bucket cover cavity, and a gear disk is rotatably connected at a center of the fixed plate through a central rotating column.

The locking mechanism and the control mechanism are both mounted on the fixed plate, and the clamping jaw locking rods of the locking mechanism are connected to the gear disk to form a transmission.

The control mechanism drives the gear disk to rotate to control the action of the clamping jaw locking rods.

Further, the locking mechanism includes at least two clamping jaw chutes distributed uniformly along a circumferential direction of the fixed plate, and the clamping jaw locking rods slidably connected to the clamping jaw chutes.

The gear disk is provided with telescopic grooves matched with the clamping jaw chutes in number along a circumferential direction of the gear disk.

One end, adjacent to each of the clamping jaw chutes, of each of the clamping jaw locking rods passes through each of the clamping jaw chutes and extends partially outside the bucket cover cavity. One end, away from each of the clamping jaw chutes, of each of the clamping jaw locking rods is connected to the gear disk in transmission by a driving rod partially embedded in each of the telescopic grooves.

The gear disk rotates to drive the clamping jaw locking rods to respectively slide along the clamping jaw chutes to adjust a length of each of the clamping jaw locking rods extending outside the bucket cover cavity.

A portion of each of the clamping jaw locking rods extending outside the bucket cover cavity is bent to form a locking end with a clamping groove.

The bucket mouth is formed with an embedding portion configured to be embedded in the clamping groove of the locking end.

Further, the control mechanism includes a driving mechanism housing mounted on the fixed plate, and a motor and a power supply that is electrically connected to the motor and supplies power to the motor are integrated in the driving mechanism housing.

The gear disk is partially formed with a meshing portion with meshing teeth along the circumferential direction, and an output end of the motor engages with the meshing portion to drive the gear disk to rotate.

Further, locking limiting assemblies matched with the clamping jaw locking rods in number are further integrated in the bucket cover cavity.

At least two groups of locking limiting assemblies and at least two clamping jaw locking rods are arranged alternately, respectively along the circumferential direction of the fixed plate.

Each of the locking limiting assemblies includes a locking trigger limiting block integrated at a lower part of the bucket cover cavity.

A proximity switch is installed at a position where the bucket cover cavity is matched with each of the locking limiting assemblies.

A gap is preset between the proximity switch and the locking trigger limiting block, where the gap includes an inductive region of the proximity switch and a non-inductive region of the proximity switch.

The locking trigger limiting block is configured to move along a radial direction of the bucket cover cavity to adjust a relative distance from the proximity switch.

When the bucket cover is snap-fitted to the bucket, the bucket drives the locking trigger limiting block to move inward the bucket cover cavity along the radial direction of the bucket cover cavity and enter the inductive region of the proximity switch.

When the locking trigger limiting block enters the inductive region of the proximity switch, the proximity switch controls the motor to rotate to drive the gear disk to rotate.

Further, one end, adjacent to the upper bucket cover plate, of the bucket cover cavity protrudes outward to form a bucket cover frame.

A space between the bucket cover frame and an outer wall of the bucket cover cavity is a space for embedding an upper end of the bucket mouth.

When the bucket cover is snap-fitted to the bucket, the bucket cover frame is placed on an outer wall of the bucket mouth portion, and the bucket cover cavity is inserted into the bucket mouth portion and in contact with an inner wall of the bucket mouth portion.

Further, the clamping jaw locking rods pass through the bucket cover frame and the bucket cover cavity.

Further, a cover handle is installed at a center of the upper bucket cover plate.

The upper bucket cover plate is provided with a charging socket, and the charging socket is provided with a charging port dustproof cover.

Further, an IC card inductive control circuit board mounting slot is formed in the cover handle, and the IC card inductive control assembly is embedded in the IC card inductive control circuit board mounting slot and blocked by an inductor cover plate.

According to the above technical solutions, the fully automatic inductive sample-collecting bucket capable of storing sample information provided by the present invention has the following advantages:

The sample-collecting bucket of the present invention integrates an RFID card capable of carrying sample coding information, and can realize the automatic cover-sealing and cover-opening function under the identification and control of the controller at the cover-pressing position and the cover-opening position. The present invention solves the problem that the cipher bucket needs manual remote control in the prior art, improves the automation and intelligence of the sample-collecting bucket, and improves the operation efficiency.

In the sample-collecting bucket of the present invention, the locking mechanism configured to form a sealed locking structure with the bucket, and the control mechanism configured to drive the locking mechanism to act are integrated in the bucket cover. Moreover, the locking trigger limiting block configured to limit the movement of the locking mechanism, and the proximity switch configured to drive the control mechanism to operate are further arranged. When the positions identify the sample information, the bucket cover will be snap-fitted to or detached from the bucket. The motor in the control mechanism is controlled to work under the drive of the locking trigger limiting block and the proximity switch to realize the action control of the locking mechanism. The whole control process has high automation and intelligence.

BRIEF DESCRIPTION OF THE DRAWINGS

In order to more clearly describe the technical solutions in the embodiments of the application or the prior art, the drawings used in the embodiments will be briefly described as follows. Apparently, the drawings described are only some embodiments recorded in the present invention, and those having ordinary skill in the art can obtain other drawings according to these drawings.

REFERENCE NUMERALS

1—bucket; 2—bucket cover; 4—gear disk; 6—control mechanism; 7—proximity switch; 8—fixed plate;
101—bucket body; 102—bucket mouth portion;
10201—bucket mouth;
201—upper bucket cover plate; 202—bucket cover cavity; 203—cover handle; 204—charging socket; 205—charging port dustproof cover;
20201—bucket cover frame;
20301—IC card inductive control circuit board mounting slot; 20302—inductor cover plate;
301—clamping jaw locking rod; 302—clamping jaw chute;
30101—locking end;
401—telescopic groove; 402—meshing portion;
501—locking trigger limiting block; 502—fixed seat; and
601—charging port.

DETAILED DESCRIPTION OF THE EMBODIMENTS

To enable those skilled in the art to better understand the technical solution of the present invention, the present invention will be further described in detail in combination with the drawings.

Figure 1:
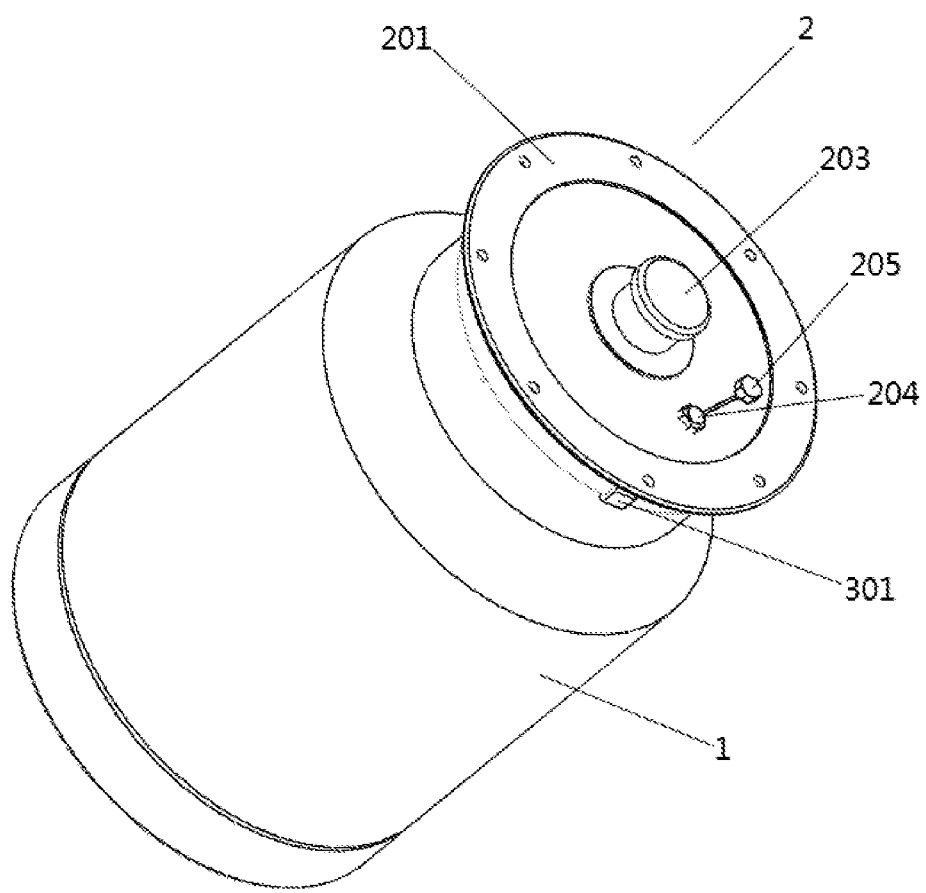
FIG. 1 is a structural schematic diagram of a fully automatic inductive sample-collecting bucket capable of storing sample information according to an embodiment of the present invention.
Figure 2:
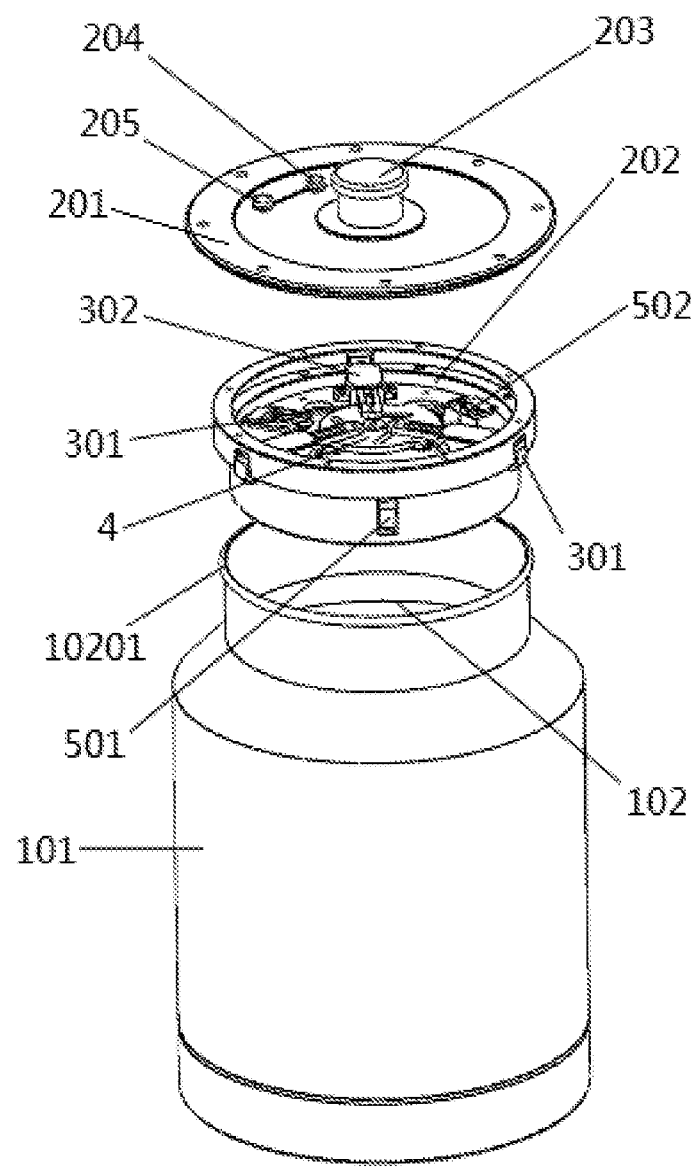
FIG. 2 is a structural exploded diagram of the fully automatic inductive sample-collecting bucket capable of storing sample information according to an embodiment of the present invention.
Figure 3:
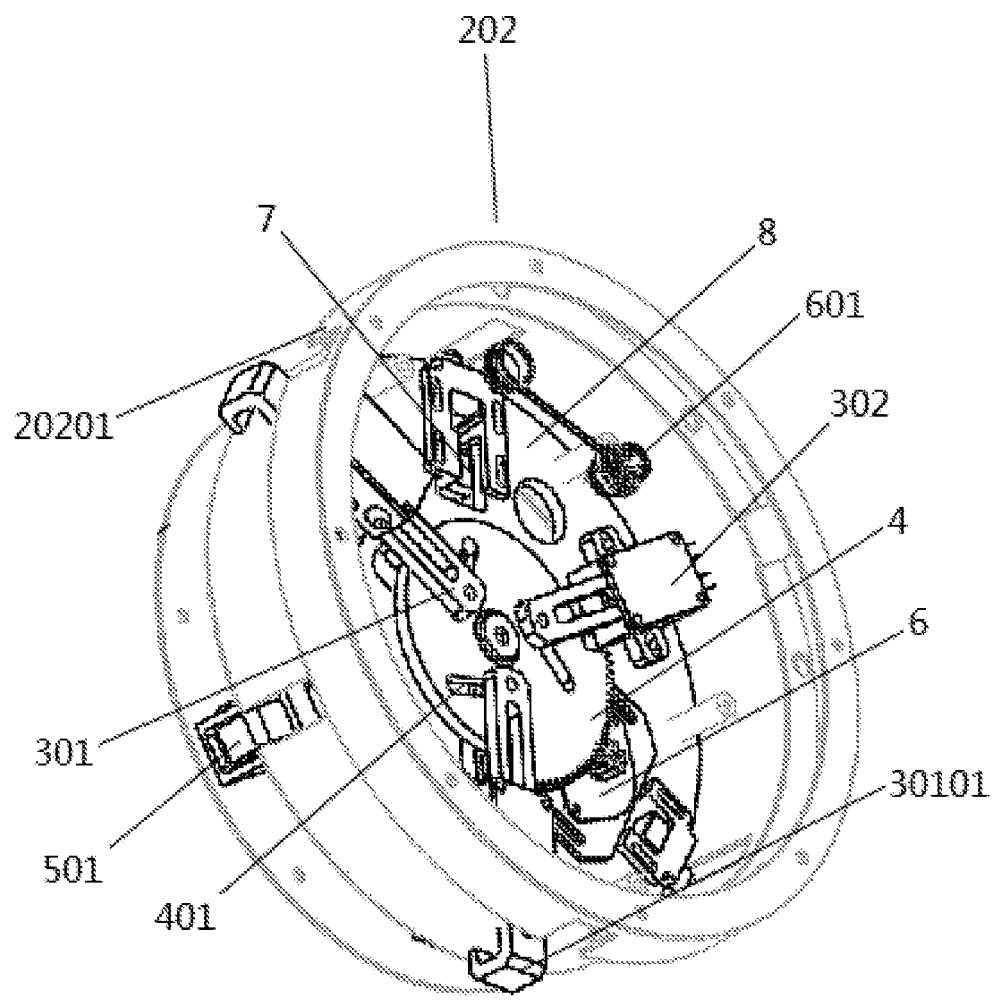
FIG. 3 is a structural schematic diagram showing the front of a bucket cover cavity of the fully automatic inductive sample-collecting bucket capable of storing sample information according to an embodiment of the present invention.
Figure 4:
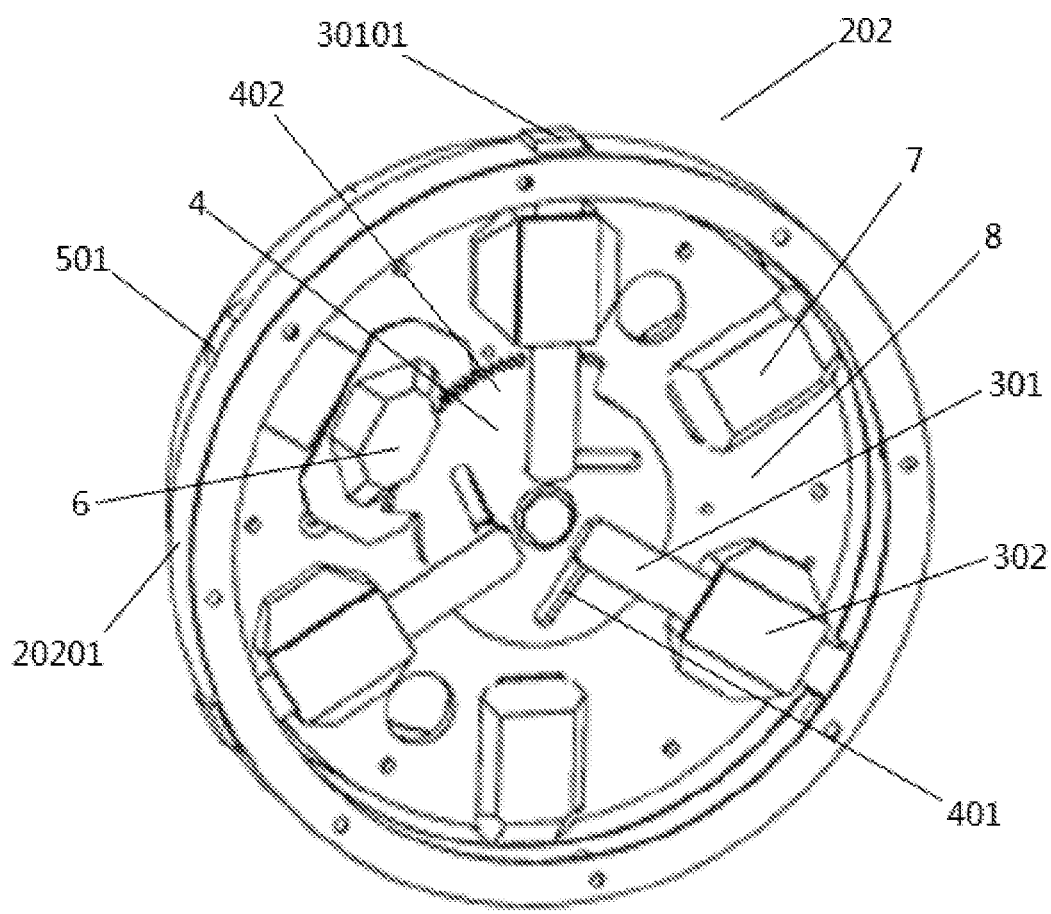
FIG. 4 is a structural schematic diagram showing the back of the bucket cover cavity of the fully automatic inductive sample-collecting bucket capable of storing sample information according to an embodiment of the present invention.
Figure 5:
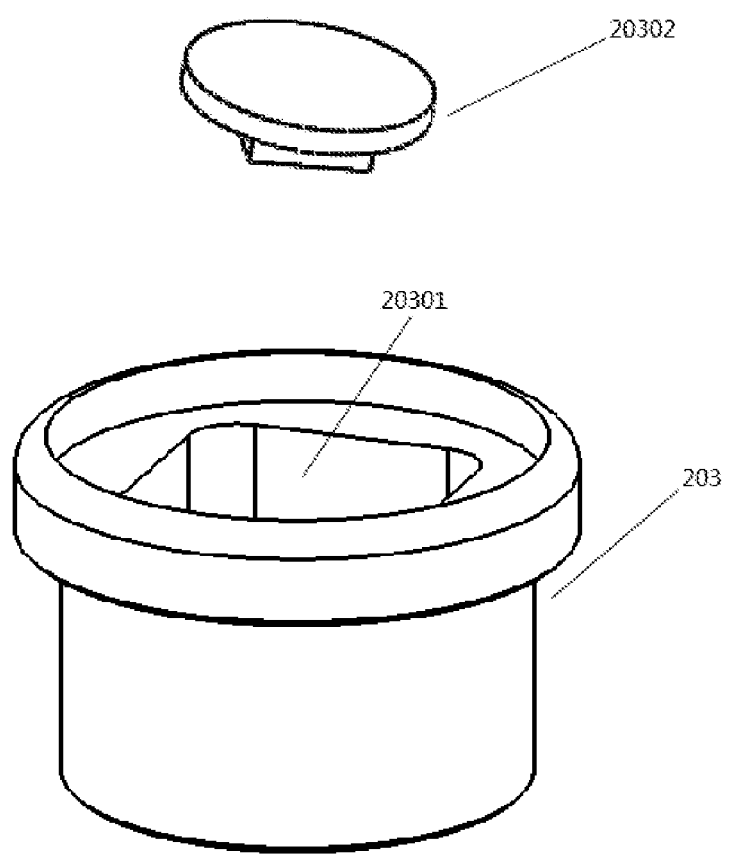
FIG. 5 is a structural schematic diagram of a cover handle of the fully automatic inductive sample-collecting bucket capable of storing sample information according to an embodiment of the present invention.

Referring to FIGS. 1 to 5.

The present invention provides a fully automatic inductive sample-collecting bucket capable of storing sample information. The sample-collecting bucket may include:

the bucket 1, in which a sample cavity for storing samples is formed; and the bucket cover 2 snap-fitted to the upper end of the bucket 1.

The bucket cover cavity 202 is formed in the bucket cover 2.

A locking mechanism, and the control mechanism 6 for driving the locking mechanism to act are integrated in the bucket cover cavity 202.

The locking mechanism includes the clamping jaw locking rods 301 configured to partially extend outside the bucket cover cavity 202, and the control mechanism drives the clamping jaw locking rods 301 to act to realize the locking and unlocking between the bucket cover 2 and the bucket 1.

An integrated circuit (IC) card inductive control assembly is integrated in the bucket cover 2.

The bucket 1 is provided with a radio frequency identification (RFID) chip.

The RFID chip is configured to store sample coding information.

The IC card inductive control assembly is configured to identify the IC card unlocking information of the external grip for cover opening work and to drive the control mechanism to work to control the action of the locking mechanism.

Specifically, the present embodiment discloses a sample-collecting bucket with high intelligence and reliable operation, which can automatically seal and open cover at the cover-pressing position and cover-opening position, respectively. During work, the sample information can be transmitted to a programmable logic controller (PLC) control system, and the PLC control system drives the work of the corresponding position, so the above functional mechanisms are correspondingly driven to work.

More specifically, the sample-collecting bucket of the present embodiment includes the bucket 1 and the bucket cover 2, where the bucket 1 is the carrier for storing the samples, and the bucket cover 2 can be snap-fitted to the upper end of the bucket 1 to seal the bucket 1. The bucket cover 2 of the present embodiment is also the installation carrier of the functional mechanisms such as the locking mechanism and the control mechanism 6, which takes up less space and has a high integration. In addition, the sample-collecting bucket can communicate with the external PLC, such that the PLC can collect the sample information to drive the work of the corresponding position, thereby driving the work of the locking mechanism and the control mechanism 6 to perform cover-closing or cover-opening operation between the bucket cover 2 and the bucket 1, which has high overall automation and remarkable intelligence.

In addition, in order to communicate with the external PLC control system to identify the sample information, in the present embodiment, an RFID card for storing the sample coding information is integrated at the lower part of the bucket 1, and the IC card inductive control assembly capable of identifying the IC card unlocking information is integrated in the bucket cover 2. By communicating with the external PLC control system, the sample-collecting bucket of the present embodiment improves intelligence, which solves the drawbacks caused by manual cover-closing and cover-opening controls.

Preferably, in the present embodiment, the bucket 1 includes the bucket body 101 having an integrated structure, and the bucket mouth portion 102 formed at the upper end of the bucket body 101 and having the opening bucket mouth 10201.

The bucket mouth portion 102 in the present embodiment is the main position for the snap-fitted connection with the bucket cover 2, and has the size matched with that of the bucket cover 2.

The bucket cover 2 is installed at the bucket mouth portion 102, and the locking mechanism and the bucket mouth portion 102 form a locking structure.

The bucket cover 2 includes the bucket cover cavity 202 and the upper bucket cover plate 201 mounted at the upper end of the bucket cover cavity 202.

The fixed plate 8 is mounted in the bucket cover cavity 202, and the gear disk 4 is rotatably connected at the center of the fixed plate 8 through a central rotating column.

The locking mechanism and the control mechanism 6 are both mounted on the fixed plate 8, and the clamping jaw locking rods 301 of the locking mechanism are connected to the gear disk 4 to form a transmission.

The control mechanism 6 drives the gear disk 4 to rotate to control the action of the clamping jaw locking rods 301.

In order to integrate the locking mechanism and the control mechanism 6, the fixed plate 8 is fixed in the bucket cover cavity 202, and the gear disk 4 is rotatably connected at the center of the fixed plate 8 through the central rotating column. The gear disk 4 rotates, under the drive of the control mechanism 6, to control the locking mechanism, and the clamping jaw locking rods 301 in the locking mechanism move to realize the locking or unlocking between the bucket cover 2 and the bucket 1.

Preferably, the locking mechanism in the present embodiment includes at least two clamping jaw chutes 302 distributed uniformly along the circumferential direction of the fixed plate 8, and the clamping jaw locking rods 301 slidably connected to the clamping jaw chutes 302. The number of the clamping jaw locking rods 301 of the locking mechanism in the present embodiment may be 2, 3, or 4. According to the number of the clamping jaw locking rods 301, multiple clamping jaw locking rods 301 are uniformly distributed along the circumferential direction of the fixed plate. When two clamping jaw locking rods 301 are arranged, the two clamping jaw locking rods 301 are 180° apart from each other. When three clamping jaw locking rods 301 are arranged, the three clamping jaw locking rods 301 are 120° apart from each other, and the like. However, taking into account the stability of the installation between the bucket cover 2 and the bucket 1, the clamping jaw locking rods 301 and the clamping jaw chutes 302 in the present embodiment are respectively at least two.

In the present embodiment, the gear disk 4 is provided with the telescopic grooves 401 matched with the clamping jaw chutes 302 in number along the circumferential direction of the gear disk 4.

One end, adjacent to each of the clamping jaw chutes 302, of each of the clamping jaw locking rods 301 passes through each of the clamping jaw chutes 302 and extends partially outside the bucket cover cavity 202. One end, away from each of the clamping jaw chutes 302, of each of the clamping jaw locking rods 301 is connected to the gear disk 4 in transmission by a driving rod partially embedded in each of the telescopic grooves 401.

The gear disk 4 rotates to drive the clamping jaw locking rods 301 to respectively slide along the clamping jaw chutes 302 to adjust the length of each of the clamping jaw locking rods 301 extending outside the bucket cover cavity 202.

The portion of each of the clamping jaw locking rods 301 extending outside the bucket cover cavity 202 is bent to form the locking end 30101 with a clamping groove.

The bucket mouth 10201 is formed with an embedding portion configured to be embedded in the clamping groove of the locking end 30101.

In order to realize the movement of the clamping jaw locking rods 301, the gear disk 4 is driven to rotate under the control of the control mechanism, and the gear disk 4 is provided with a corresponding number of telescopic grooves 401 according to the number of the clamping jaw locking rods 301. The telescopic grooves 401 may be rectangular grooves or elongated circular grooves. The clamping jaw locking rods 301 are respectively movably connected to the telescopic grooves 401 by the driving rod, and the gear disk 4 rotates to drive the clamping jaw locking rods 301 to respectively move along the clamping jaw chutes 302. When the gear disk 4 in the present embodiment rotates clockwise, the gear disk 4 drives the clamping jaw locking rods 301 to move inward along the radial direction of the fixed plate 8, and the clamping groove of each of the clamping jaw locking rods 301 will lock the bucket mouth 10201 of the bucket mouth portion 102 to form a locked state. When the gear disk 4 rotates counterclockwise, the gear disk 4 drives the clamping jaw locking rods 301 to move outward along the radial direction of the fixed plate 8, and the clamping groove of each of the clamping jaw locking rods 301 will release the bucket mouth of the bucket mouth portion 102 to form an unlocked state.

In design, according to the size and shape of the bucket mouth 10201, it is ensured that the bent clamping jaw locking rods 301 can make the bucket mouth 10201 embedded.

Preferably, the control mechanism 6 in the present embodiment includes a driving mechanism housing mounted on the fixed plate 8, and a motor and a power supply that is electrically connected to the motor and supplies power to the motor are integrated in the driving mechanism housing.

The gear disk 4 is partially formed with the meshing portion 402 with meshing teeth along the circumferential direction, and the output end of the motor engages with the meshing portion 402 to drive the gear disk 4 to rotate.

The control mechanism 6 in the present embodiment is the main mechanism for driving the gear disk 4 to rotate. The motor engages with the meshing portion 402 of the gear disk 4, and the forward or reverse rotation of the motor will drive the gear disk 4 to rotate to realize the sliding of the clamping jaw locking rods 301.

Preferably, locking limiting assemblies matched with the clamping jaw locking rods 301 in number are further integrated in the bucket cover cavity 202 in the present embodiment.

At least two groups of locking limiting assemblies and at least two clamping jaw locking rods 301 are arranged alternately, respectively along the circumferential direction of the fixed plate 8.

Each of the locking limiting assemblies includes the locking trigger limiting block 501 integrated at the lower part of the bucket cover cavity 202.

The proximity switch 7 is installed at the position where the bucket cover cavity 202 is matched with each of the locking limiting assemblies.

A gap is preset between the proximity switch 7 and the locking trigger limiting block 501, where the gap includes the inductive region of the proximity switch and the non-inductive region of the proximity switch 7.

The locking trigger limiting block 501 is configured to move along the radial direction of the bucket cover cavity 202 to adjust the relative distance from the proximity switch 7.

When the bucket cover 2 is snap-fitted to the bucket 1, the bucket 1 drives the locking trigger limiting block 501 to move inward the bucket cover cavity 202 along the radial direction of the bucket cover cavity 202 and enter the inductive region of the proximity switch 7.

When the locking trigger limiting block 501 enters the inductive region of the proximity switch 7, the proximity switch 7 controls the motor to rotate to drive the gear disk 4 to rotate.

The locking limiting assemblies described in the present embodiment are matched with the clamping jaw locking rods 301 in number. When arranged, the clamping jaw locking rods 301 and the locking limiting assemblies are distributed at intervals along the circumferential direction of the fixed plate. According to the number of the clamping jaw locking rods 301 and the number of the locking limiting assemblies, openings are formed at the corresponding positions of the bucket cover cavity 202. The clamping jaw locking rods 301 and the locking trigger limiting block 501 partially extend outside the openings, respectively, and can move in the openings along the radial direction of the fixed plate 8. A part, located in the bucket cover cavity 202, of the locking trigger limiting block 501 is movably installed through the fixed seat 502.

During installation, in an unlocking state, the locking trigger limiting block 501 is located outside the bucket cover cavity 202 and has a predetermined distance from the proximity switch 7. In this case, the proximity switch 7 does not trigger a switch signal. When the bucket cover 2 is in contact with the bucket body 101 and the bucket body 101 is pushed and dropped, the locking trigger limiting block 501 is pushed inward to shorten the distance between the locking trigger limiting block 501 and the proximity switch 7 and drive the locking trigger limiting block 501 to enter the inductive region of the proximity switch 7. In this case, the proximity switch 7 triggers the switch signal and issues an electrical instruction to control the motor to operate, such that the design purpose of driving the gear disk 4 to rotate can be achieved. The whole control process has a high automation.

Preferably, in the present embodiment, one end, adjacent to the upper bucket cover plate 201, of the bucket cover cavity 202 protrudes outward to form the bucket cover frame 20201.

The space between the bucket cover frame 20201 and the outer wall of the bucket cover cavity 202 is the space for embedding the upper end of the bucket mouth 10201.

When the bucket cover 2 is snap-fitted to the bucket 1, the bucket cover frame 20201 is placed on the outer wall of the bucket mouth portion 102, and the bucket cover cavity 202 is inserted into the bucket mouth portion 102 and in contact with the inner wall of the bucket mouth portion 102.

The bucket cover cavity 202 in the present embodiment is configured as a double-layer structure. When the bucket cover 2 engages with the bucket 1, the bucket cover cavity 202 is partially inserted into the bucket 1 and partially placed outside the bucket 1, thereby achieving excellent sealing and structural stability after snap-fitting.

The clamping jaw locking rods 301 pass through the bucket cover frame 20201 and the bucket cover cavity 202.

Preferably, the cover handle 203 is installed at the center of the upper bucket cover plate 201.

The upper bucket cover plate 201 is provided with the charging socket 204, and the charging socket 204 is provided with the charging port dustproof cover 205. The charging socket 204 is arranged at the upper bucket cover plate 201 to facilitate charging the internal motor, and the charging port dustproof cover 205 can prevent dust from entering the cavity.

Preferably, in the present embodiment, the IC card inductive control circuit board mounting slot 20301 is formed in the cover handle 203, and the IC card inductive control assembly is embedded in the IC card inductive control circuit board mounting slot 20301 and blocked by the inductor cover plate 20302.

In the above technical solutions, a fully automatic inductive sample-collecting bucket capable of storing sample information provided by the present invention has the following advantages:

The sample-collecting bucket of the present invention integrates an RFID card capable of carrying sample coding information, and can realize the automatic cover-sealing and cover-opening function under the identification and control of the controller at the cover-pressing position and the cover-opening position. The present invention solves the problem that the cipher bucket needs manual remote control in the prior art, improves the automation and intelligence of the sample-collecting bucket, and improves the operation efficiency.

In the sample-collecting bucket of the present invention, the locking mechanism configured to form a sealed locking structure with the bucket 1, and the control mechanism 6 configured to drive the locking mechanism to act are integrated in the bucket cover 2. Moreover, the locking trigger limiting block 501 configured to limit the movement of the locking mechanism, and the proximity switch 7 configured to drive the control mechanism 6 to operate are further arranged. When the positions identify the sample information, the bucket cover 2 will be snap-fitted to or detached from the bucket 1. The motor in the control mechanism 6 is controlled to work under the drive of the locking trigger limiting block 501 and the proximity switch 7 to realize the action control of the locking mechanism. The whole control process has high automation and intelligence.

Only some exemplary embodiments of the present invention are described in an illustrative manner, and it is obvious for those having ordinary skill in the art, without deviating from the ideas and scope of the present invention, to modify the described embodiments in different methods. Therefore, the above drawings and description are essentially illustrative and should not be understood as a limitation on the protection scope of the claims of the present invention.

What is claimed is:

1. A fully automatic inductive sample-collecting bucket capable of storing sample information, comprising:
    a bucket, wherein a sample cavity for storing samples is formed in the bucket; and
    a bucket cover snap-fitted to an upper end of the bucket;
    wherein the bucket cover comprises a bucket cover cavity;
    a locking mechanism, and a control mechanism for driving the locking mechanism to act are integrated in the bucket cover cavity;
    the locking mechanism comprises clamping jaw locking rods configured to partially extend outside the bucket cover cavity, and the control mechanisms drives the clamping jaw locking rods to act to carry out a locking and unlocking between the bucket cover and the bucket;
    an integrated circuit (IC) card inductive control assembly is integrated in the bucket cover;
    the bucket is provided with a radio frequency identification (RFID) chip; and
    the RFID chip is configured to store sample coding information.

2. The fully automatic inductive sample-collecting bucket according to claim 1, wherein the bucket comprises a bucket body having an integrated structure, and a bucket mouth portion, wherein the bucket mouth portion is formed at an upper end of the bucket body and the bucket mouth portion has an opening bucket mouth;
    the bucket cover is installed at the bucket mouth portion, and the locking mechanism and the bucket mouth portion form a locking structure.

3. The fully automatic inductive sample-collecting bucket according to claim 2, wherein the bucket cover comprises the bucket cover cavity and an upper bucket cover plate, wherein the upper bucket cover plate is mounted at an upper end of the bucket cover cavity;
    a fixed plate is mounted in the bucket cover cavity, and a gear disk is rotatably connected at a center of the fixed plate through a central rotating column;
    the locking mechanism and the control mechanism are mounted on the fixed plate, and the clamping jaw locking rods of the locking mechanism are connected to the gear disk to form a transmission; and
    the control mechanism drives the gear disk to rotate to control an action of the clamping jaw locking rods.

4. The fully automatic inductive sample-collecting bucket according to claim 3, wherein
the locking mechanism comprises:
at least two clamping jaw chutes, wherein the at least two clamping jaw chutes are distributed uniformly along a circumferential direction of the fixed plate, and
the clamping jaw locking rods, wherein the clamping jaw locking rods are slidably connected to the at least two clamping jaw chutes, respectively;
the gear disk is provided with telescopic grooves, wherein the telescopic grooves are matched with the at least two clamping jaw chutes in number along a circumferential direction of the gear disk;
a first end of each of the clamping jaw locking rods is adjacent to each of the at least two clamping jaw chutes, and the first end of each of the clamping jaw locking rods passes through each of the at least two clamping jaw chutes and extends partially outside the bucket cover cavity;
a second end of each of the clamping jaw locking rods is away from each of the at least two clamping jaw chutes, and the second end of each of the clamping jaw locking rods is connected to the gear disk in the transmission by a driving rod, wherein the driving rod is partially embedded in each of the telescopic grooves;
the gear disk rotates to drive the clamping jaw locking rods to respectively slide along the at least two clamping jaw chutes to adjust a length of each of the clamping jaw locking rods, wherein the length is defined by each of the clamping jaw locking rods extending outside the bucket cover cavity;
a portion of each of the clamping jaw locking rods is bent to form a locking end with a clamping groove, wherein the portion of each of the clamping jaw locking rods extends outside the bucket cover cavity; and
the bucket mouth is formed with an embedding portion, wherein the embedding portion is configured to be embedded in the clamping groove of the locking end.

5. The fully automatic inductive sample-collecting bucket according to claim 4, wherein the control mechanism comprises a driving mechanism housing mounted on the fixed plate, and a motor and a power supply are integrated in the driving mechanism housing, wherein the power supply is electrically connected to the motor and the power supply supplies power to the motor; and
the gear disk is partially formed with a meshing portion with meshing teeth along the circumferential direction of the gear disk, and an output end of the motor engages with the meshing portion to drive the gear disk to rotate.

6. The fully automatic inductive sample-collecting bucket according to claim 5, wherein locking limiting assemblies are matched with the clamping jaw locking rods in number, and the locking limiting assemblies are further integrated in the bucket cover cavity;
at least two groups of locking limiting assemblies and at least two clamping jaw locking rods are arranged alternately, respectively along the circumferential direction of the fixed plate;
each of the at least two groups of locking limiting assemblies comprises a locking trigger limiting block, wherein the locking trigger limiting block is integrated at a lower part of the bucket cover cavity;
a proximity switch is installed at a position where the bucket cover cavity is matched with each of the at least two groups of locking limiting assemblies;
a gap is preset between the proximity switch and the locking trigger limiting block, wherein the gap comprises an inductive region of the proximity switch and a non-inductive region of the proximity switch;
the locking trigger limiting block is configured to move along a radial direction of the bucket cover cavity to adjust a relative distance from the proximity switch;
when the bucket cover is snap-fitted to the bucket, the bucket drives the locking trigger limiting block to move inward the bucket cover cavity along the radial direction of the bucket cover cavity and then enter the inductive region of the proximity switch; and
when the locking trigger limiting block enters the inductive region of the proximity switch, the proximity switch controls the motor to rotate to drive the gear disk to rotate.

7. The fully automatic inductive sample-collecting bucket according to claim 4, wherein the upper end of the bucket cover cavity protrudes outward to form a bucket cover frame;
a space between the bucket cover frame and an outer wall of the bucket cover cavity is a space for embedding an upper end of the bucket mouth; and
when the bucket cover is snap-fitted to the bucket, the bucket cover frame is placed on an outer wall of the bucket mouth portion, the bucket cover cavity is inserted into the bucket mouth portion and the bucket cover cavity is in contact with an inner wall of the bucket mouth portion.

8. The fully automatic inductive sample-collecting bucket according to claim 7, wherein the clamping jaw locking rods pass through the bucket cover frame and the bucket cover cavity.

9. The fully automatic inductive sample-collecting bucket according to claim 3, wherein a cover handle is installed at a center of the upper bucket cover plate; and
the upper bucket cover plate is provided with a charging socket, and the charging socket is provided with a charging port dustproof cover.

10. The fully automatic inductive sample-collecting bucket according to claim 9, wherein an IC card inductive control circuit board mounting slot is formed in the cover handle, the IC card inductive control assembly is embedded in the IC card inductive control circuit board mounting slot and the IC card inductive control assembly is blocked by an inductor cover plate.

\* \* \* \* \*